April 9, 1968 L. HELD 3,376,759
DEVICE FOR COMPENSATING UNBALANCES OF REVOLVING
AXIALLY SYMMETRICAL PARTS
Filed July 31, 1964 7 Sheets-Sheet 1

Inventor
Ludwig Held
By Stevens, Davis, Miller & Mosher
Attorneys

Inventor
Ludwig Held

Inventor
Ludwig Held
By Stevens, Davis, Miller & Mosher
Attorneys

April 9, 1968 L. HELD 3,376,759
DEVICE FOR COMPENSATING UNBALANCES OF REVOLVING
AXIALLY SYMMETRICAL PARTS
Filed July 31, 1964 7 Sheets-Sheet 4

Inventor
Ludwig Held
By Stevens Davis Miller & Mosher
Attorneys

April 9, 1968 L. HELD 3,376,759
DEVICE FOR COMPENSATING UNBALANCES OF REVOLVING
AXIALLY SYMMETRICAL PARTS
Filed July 31, 1964 7 Sheets-Sheet 5

Inventor
Ludwig Held
By Stevens, Davis, Miller & Mosher
Attorneys

April 9, 1968 L. HELD 3,376,759
DEVICE FOR COMPENSATING UNBALANCES OF REVOLVING
AXIALLY SYMMETRICAL PARTS
Filed July 31, 1964 7 Sheets-Sheet 6

Inventor
Ludwig Held
By Stevens, Davis, Miller & Mosher
Attorneys

April 9, 1968   L. HELD   3,376,759
DEVICE FOR COMPENSATING UNBALANCES OF REVOLVING
AXIALLY SYMMETRICAL PARTS
Filed July 31, 1964   7 Sheets-Sheet 7

INVENTOR
LUDWIG HELD

BY Stevens, Davis, Miller & Mosher
ATTORNEYS

United States Patent Office 3,376,759
Patented Apr. 9, 1968

---

3,376,759
DEVICE FOR COMPENSATING UNBALANCES OF REVOLVING AXIALLY SYMMETRICAL PARTS
Ludwig Held, Darmstadt, Germany, assignor to Gebr. Hofmann K.G., Darmstadt, Germany
Filed July 31, 1964, Ser. No. 386,571
Claims priority, application Germany, Aug. 8, 1963, H 49,953
13 Claims. (Cl. 74—573)

ABSTRACT OF THE DISCLOSURE

A device for compensating for unbalances of axially symmetrical parts revolving about their axes including a casing integral with the rotating part. The casing containing a plurality of weights disposed to move along at least two divergent radii of the casing to generate centrifugal forces compensating for the unbalance. The weights being moved in response to a detection of unbalance with the length of movement being a function of the amount of unbalance.

---

The invention relates to a device for compensating unbalances of revolving axially symmetrical parts, particularly of grinding discs or other revolving tools.

In numerous fields of the art, rotating parts are used, for example, grinding discs or other revolving tools whose mass and/or configuration is continuously varied, for example, due to normal wear. It is therefore desirable and necessary to compensate these unbalances of revolving parts continuously in order to assure precise working conditions and also to prevent accidents.

Hitherto, therefore, revolving parts, such as grinding discs have been detached at periodic intervals from their driving machines, together with their fastening flange, in order to be balanced separately by means of suitable devices such as roller rails, roller frames, balancing scales or dynamic balancing machines, in connection with a so-called balancing mandrel. This procedure, of course, is not only very time consuming, but also unsatisfactory insofar as an unbalance of a grinding spindle which did not separate from the machine could not be balanced. Similarly unbalances created by a central tightening nut provided to secure the grinding disc to the spindle, and/or by a coolant solution, could not be corrected when the grinding discs were balanced separate from the grinding machine. Certain improvements could be achieved by apparatuses for balancing grinding discs permitting determination of unbalances directly at the grinding disc. These apparatuses, however, were disadvantageous since the grinding disc had to be stopped each time when a compensation of the masses of the grinding disc was performed, and again when the mass compensation was inaccurate. Furthermore, apparatuses of this type are also bulky and expensive to manufacture.

It is therefore a chief object of this invention to provide a device for balancing revolving parts permitting the compensation of unbalances during rotation.

It is another object of this invention to provide a device for balancing revolving parts in a single plane as well as in two planes.

A further object of this invention is to provide a device for balancing revolving parts which are subject to a continuous variation of their mass distribution.

Further objects and advantages of the present invention will be apparent from the following description reference being had to the accompanying drawings wherein preferred embodiments of this invention are clearly shown.

Figure 2:
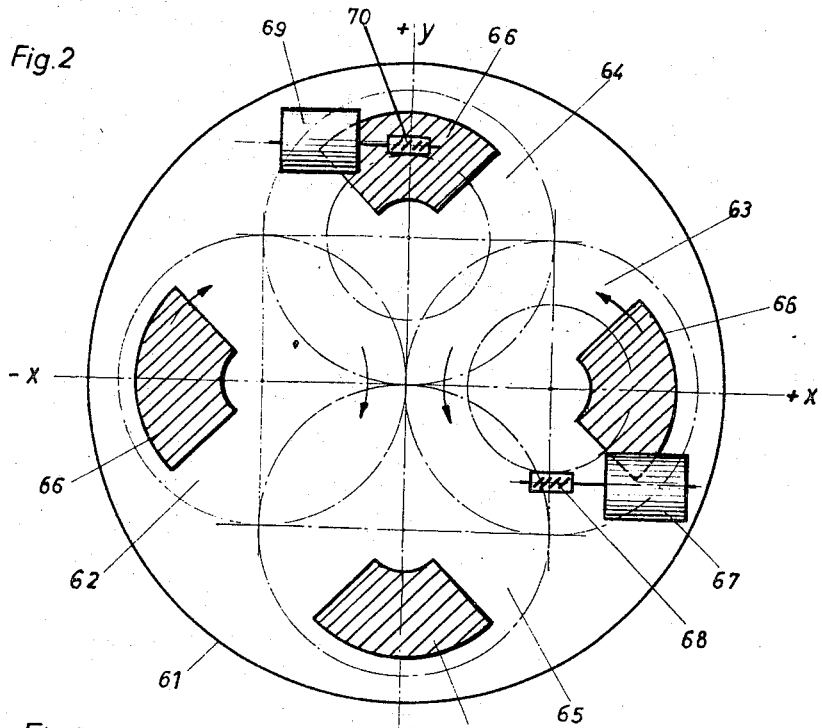
FIG. 2 is a schematical front view of a preferred embodiment of a device according to this invention.
Figure 3:
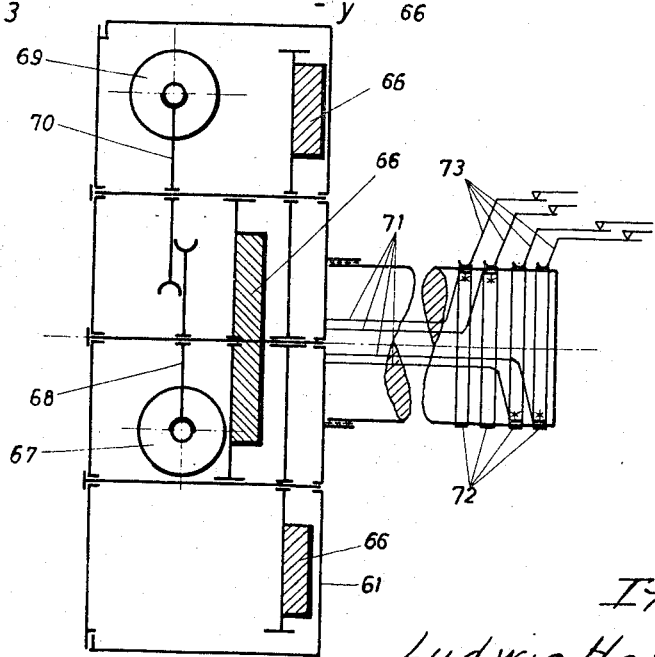
Figure 4:
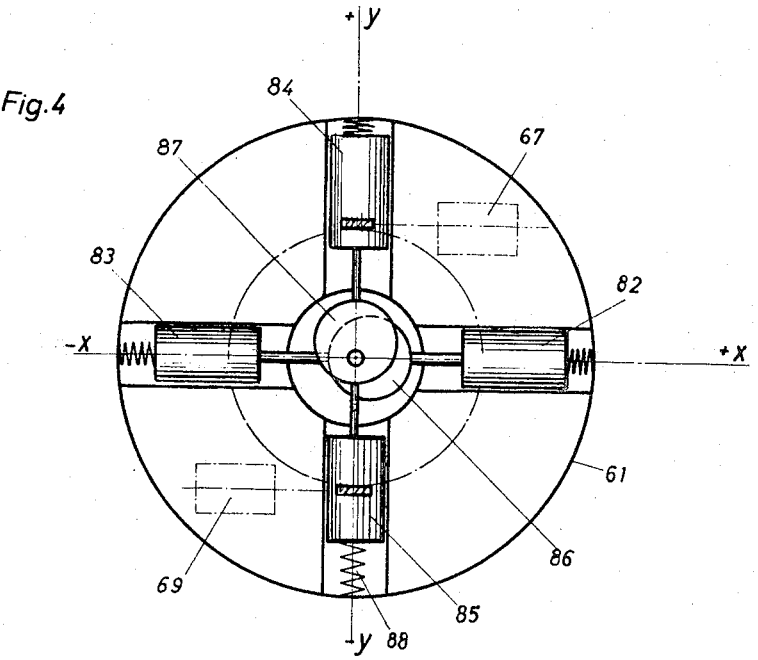
Figure 5:
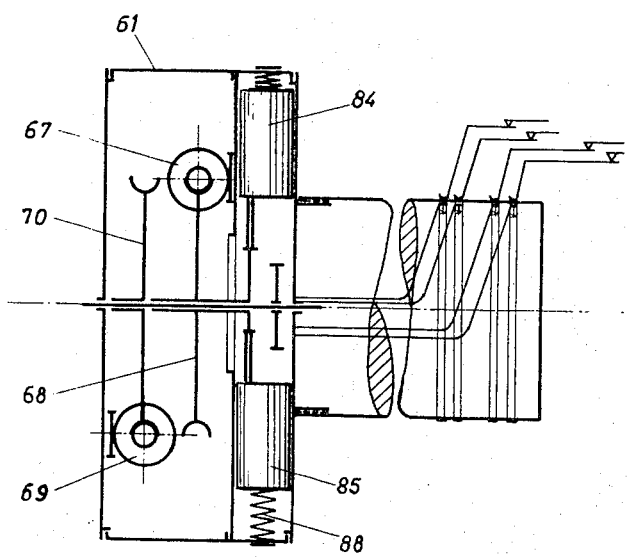
Figure 6:
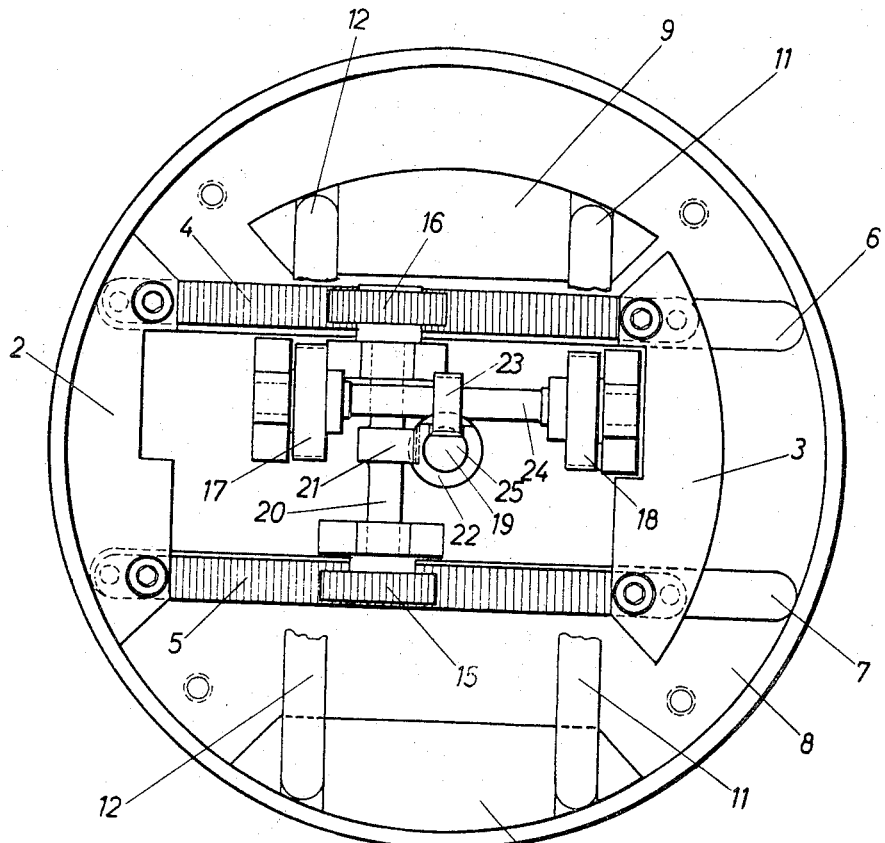
Figure 8:
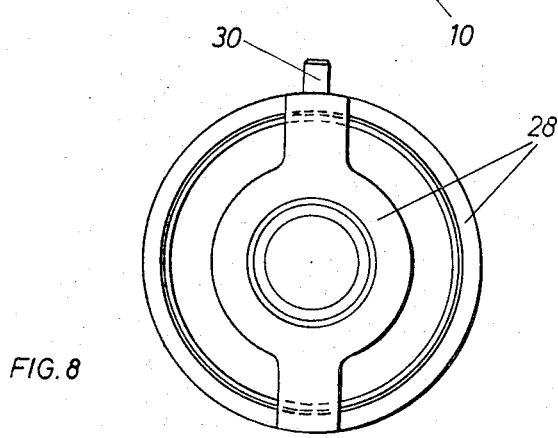
Figure 9:
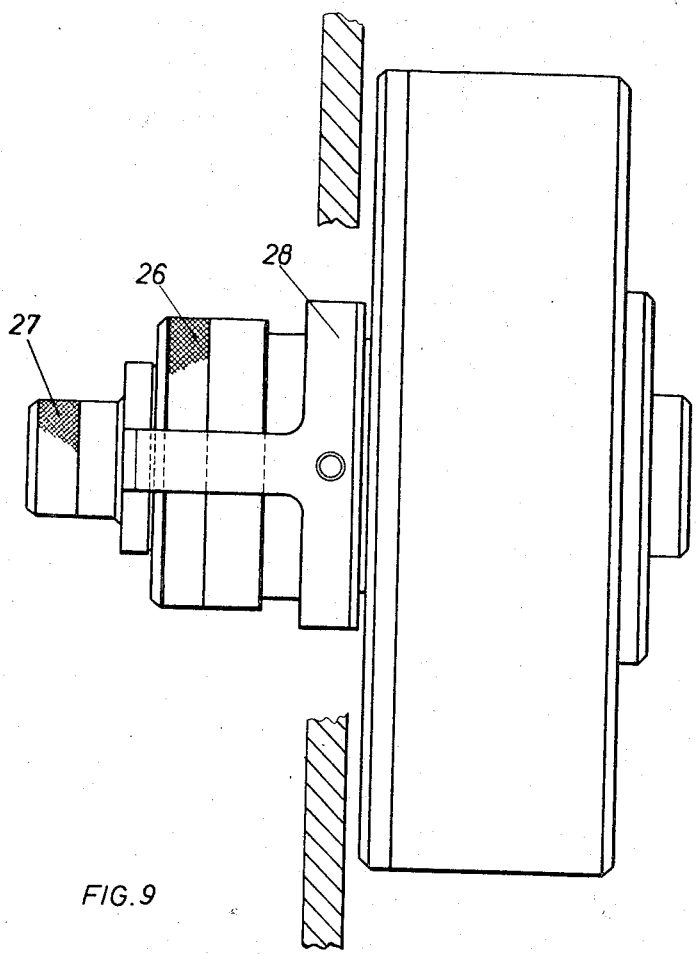
Figure 10:
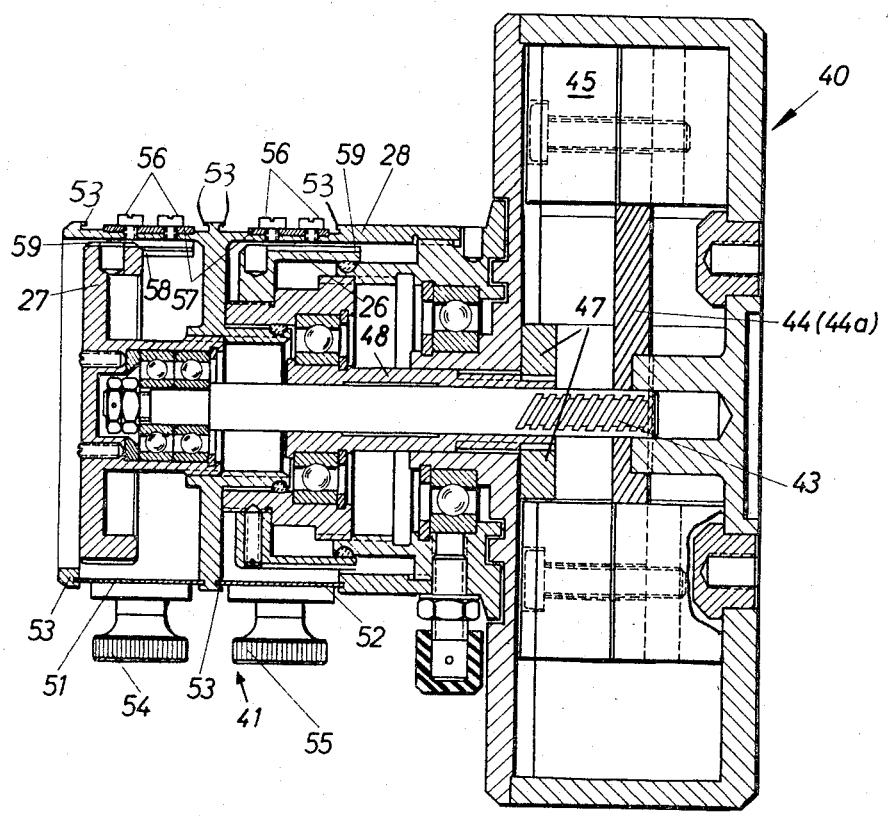
Figure 11:
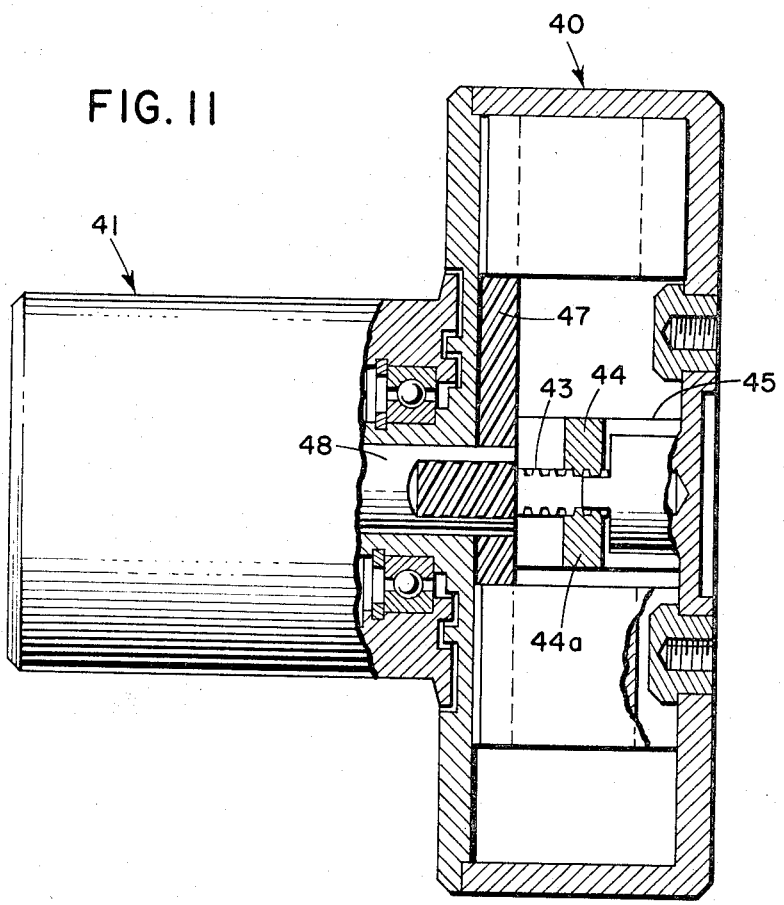

FIG. 3 gives a side elevational view of a cross-section taken along the line $(+)Y-(-)Y$ in FIG. 2;

FIG. 4 is a front elevational view of another preferred embodiment of a device according to this invention;

FIG. 5 represents a side elevational view of a cross-section taken along the line $(+)Y-(-)Y$ in FIG. 4;

FIG. 6 illustrates a front elevational view of a further preferred embodiment of this invention;

FIG. 7 shows a side elevational view of a vertical crosssection through FIG. 6;

FIG. 8 shows a partial rear view of FIG. 7;

FIG. 9 gives a side elevational view of the device of FIG. 7;

FIG. 10 represents a side elevational view of a cross-section through a further embodiment of this invention; and FIG. 11 is a partial sectional view of the present invention, similar to FIG. 10 and taken along a plane perpendicular thereto, with parts omitted for the sake of clarity.

Figure 1:
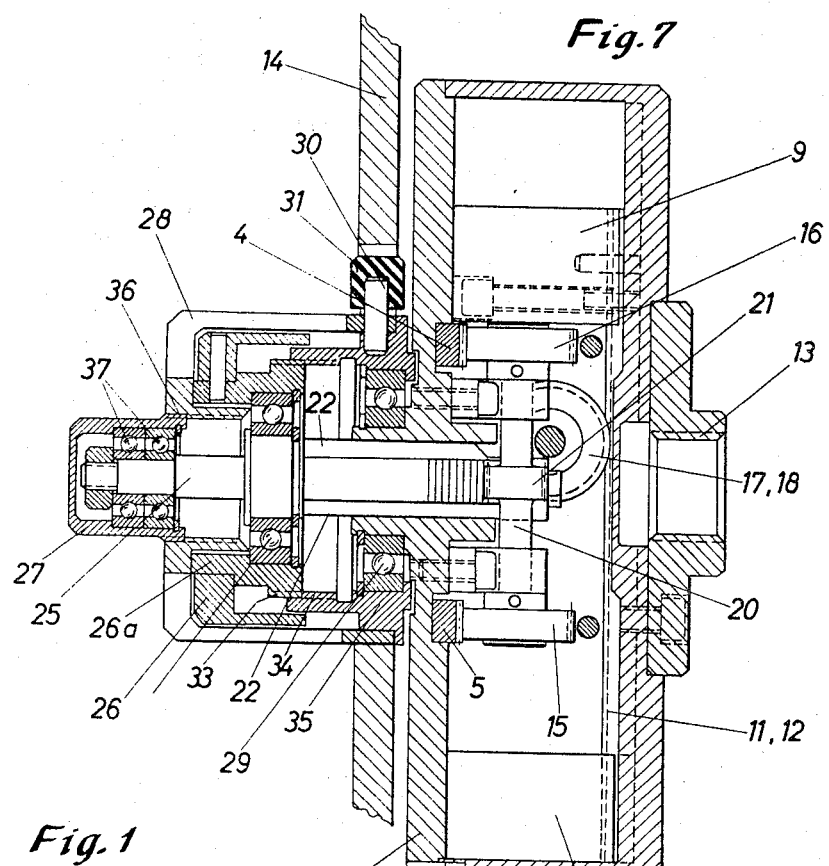
FIG. 1 shows schematically the conditions prevailing due to an unbalance of anaxially symmetrical part, and the analysis of the resulting force vector into two force components.

Referring now in detail to the drawings, FIG. 1 schematically illustrates an axially symmetrical part K supported by a shaft having a main axis O. The center of gravity S of the part K, however, does not coincide with the axis O but is located at a point remote therefrom and determined by the coordinates $Sx$ and $Sy$ parallel to the axes X and Y of a coordinate system. The part K is therefore during rotation subject to an unbalance according to this displacement of the center of gravity S.

In order to compensate this unbalance, it is necessary to apply additional masses or to vary the distribution of masses in such a manner that the components of unbalance in direction of the X and Y axes are compensated and that the center of gravity S coincides with the axis O.

FIGS. 2 and 3 illustrate a preferred embodiment of a device according to this invention which is particularly adapted to balance grinding discs. The device has a case 61 which can be flanged, for example, to the front flange of the grinding disc support, thus being rigidly connected to the revolving grinding disc and rotating therewith. Two sets of gear wheels 62, 63 and 64, 65 are arranged within the case 61. The gear wheels 62 and 63 mate with each other and their axes are located on the X axis whereas the axes of the gear wheels 64 and 64 which likewise mate with each other, are located on the Y axis. The gear wheels 62, 63 and 64, 65 each are provided with a weight member 66. In FIG. 2, these weight members 66 are shown in exactly opposite position so that their influences on the location of the center of gravity just neutralize each other. The value of the weight of members 66 can be selected according to the respective requirements.

By means of a reversible servo motor 67, the gear wheel 63 belonging to the pair of gear wheels associated with the X axis, can be rotated through a worm gear 68. The rotating gear 63 then moves the mating gear wheel 62 in the opposite sense. Depending on the sense of rotation of the servo motor 67 the weight members 66 of the gear wheels 62 and 63 consequently apply a component of unbalance in the direction of the $+Y$ or the $-Y$ axis of the coordinate system. By means of the pair of gear wheels 62, 63 it is therefore possible to compensate that component of unbalance of the part which is directed parallel to the Y axis $(Sy)$.

Similar explanations are true with respect to the component of unbalance of the part which is directed parallel to the X axis. The pair of gear wheels 64, 65 serves to compensate this X component of unbalance. It can be activated by means of a second reversible servo motor 69 and through a worm gear 70.

The electric current to energize servo motor 67 and 69 is supplied via conduits 71, sliding rings 72, and brushes 73.

Since servo motors 67 and 69 are reversible in their sense of rotation, two switches are required for each pair of gear wheels or each servo motor for manual operation. Four switches therefore have to be provided, i.e. one switch for each component of unbalance in direction of the +X, −X, +Y and the −Y axis.

The rotation of the servo motors and the corresponding displacement of the weight members is performed dependent upon the measuring results of a device for determining unbalances. This device is known per se and is operated preferably on an electric or an electronic basis. This measuring device is connected to a pick-up means sensing the vibrations of the part to be balanced caused by unbalances at the bearings or at the case. The value of the measured unbalances is indicated by means of a suitable dial gauge. In connection with this operation, one of the pairs of gear wheels is actuated until the instrument cooperating therewith indicates a minimum of unbalance. This guarantees that one of the two unbalance components is compensated. The second gear wheel pair is then actuated until the dial of a second instrument indicates that the unbalance is below the required tolerances.

This device previously described can easily be operated in a fully automatic manner. For this purpose a measuring device likewise known per se can be used which in addition to a vibration pick-up device is equipped with a phase indicator which for example rotates in locked phase relation with the rotor or scans a reference mark at the rotor in connection with photoelectric means. The measuring device determines the components of the resultant unbalance and feeds the servo motors by means of suitable control devices known per se with a current of appropriate sense until the components of the unbalance have been compensated within the desired tolerance limits.

Two devices of the type previously described can be arranged in two different planes so that balancing can be easily performed in two planes (dynamic balancing). Optionally, a circuit known in connection with other conventional balancing machines, the so-called "electric frame," can then also be employed.

FIGS. 4 and 5 illustrate another preferred embodiment of this invention. Four weight members 82, 83; 84 and 85 are arranged within the case 61 of the device along the coordinate axes X, Y. By means of eccentric discs 86 and 87, respectively, oppositely positioned weight members can be displaced inwardly or outwardly of their central position. The weight members can be coupled with the respective eccentric discs either by means of a connecting rod or by push rods. In the latter case it is necessary to compensate the centrifugal forces acting on the weight members during the rotation by means of appropriate springs 88. The discs are supported on (FIG. 5) coaxial shafts and are likewise driven by servo motors 67, 69 and worm gears 68, 70. The operation and the application of the device according to FIGS. 4 and 5 are analogous to those of the device of FIGS. 2 and 3.

The previously described electrical servo motors can be replaced by corresponding hydraulic control units including suitable control valves and pressure reducing valves.

FIG. 6 shows the case of another embodiment of this invention, this case in the following being referred to as a balancing head. FIG. 6 shows the case without its cover. The case or the balancing head contains a first slidable weight carrier including the weight segments 2, 3 and the racks 4, 5. In FIG. 6 the carrier is shown moved into its left end position. The movement of the carrier takes place along longitudinal guiding ways 6, 7 provided in the main body 8 of the balancing head.

A second carrier including the weight segments 9 and 10 which are connected to the racks 11 and 12 permits a mass displacement in a direction different from the direction along which the first carrier is slidable. Preferably these two directions are perpendicular to each other. In FIG. 6, only a fractional view of the parts of the second carrier is given.

The represented balancing head can be attached directly to a grinding disc or to another revolving tool. The connection with the grinding disc or the like is accomplished as evident from FIG. 7 by means of an internal thread 1 at the right side of the head. The balancing head thereby has also the function of a tightening nut. The grinding disc according to the illustration of FIG. 7 could be located at the right side of the balancing head. The balancing head is also associated with a non-rotating machine part 14 as referred to below.

Pinions 15, 16 and 17, 18 being connected in pairs by a shaft 20 and 24 respectively are supported at the main body 8 of the balancing head. The pinions each mate with one of the beforementioned racks 4, 5 or 11, 12. Due to rotation of the pinions the corresponding pairs of racks are moved together with the respective weight segments 2, 3 or 9, 10 attached thereto.

The function of a pair of racks 4, 5 or 11, 12 could likewise be performed by a single rack extending radially through the center 19 of the balancing head. By virtue of this fact it is proper to refer to the racks 4, 5 and 11, 12 as radially movable racks in contrast to axially movable racks to be described below. The radial movement of the first carrier including the parts 2, 3, 4, 5 is caused by turning the pair of pinions 15, 16. The shaft 20 connecting the two pinions 15, 16 comprises a further pinion 21 mating with an axially movable rack 22. The rack 22 is formed by a round tubular member flattened at its left side (FIG. 6) and being there provided with teeth. At its upper side (FIG. 6) the rack 22 is open along a certain portion in an axial direction to provide space for a further pinion 23 described below. It becomes clear that an axial displacement of rack 22 causes rotation of pinion 21.

Similarly, an axial movement is transformed into a rotation of the pair of pinions 17, 18 by means of pinion 23 keyed to shaft 24 in cooperation with a rack 25. The rack 25 is guided by the hollow rack 22 concentrically thereto.

All the parts described—except the stationary machine part 14—rotates with the grinding disc or another part to be balanced. The additional parts described in the following serve to cause the required axial displacement of the racks 22, 25 by means of knurled adjusting wheels 26 and 27 not rotating with the grinding disc. These wheels 26 and 27 as shown in FIGS. 7 and 8, are positioned adjacent and coaxially to each other. The adjusting wheels are encompassed by a hood 28 (FIGS. 8, 9) open at two sides. Hood 28 is stationary and supported at the rotating main body 8 by means of ball bearing 29. A pin 30 is provided in order to prevent hood 28 from rotating due to bearing friction. Pin 30 is held in its position by means of a rubber knob 31 received by a corresponding recess in stationary machine part 14. This machine part 14 can be for example a hinged protecting lid of the head stock.

The adjusting wheel 26 is associated with rack 22 through a ball bearing 32. Rack 22 and bearing 26 are rigidly connected to each other in axial relationship since the inner ring of ball bearing 32 is fixedly mounted to rack 22.

For reasons of easier manufacture adjusting wheel 26 is made of the two parts 26 and 26a. Part 26a is provided with an outer fine thread 33 engaging the inner thread 34 of the hood part 35, which is rigidly connected to the hood 28. Adjusting wheel 26 therefore is urged to move axially in a left or right direction, depending on the sense of its rotation. Since in FIG. 6 the left end position of the weight segments 2, 3 is represented, in this case of course only axial movement to the right is possible.

The axial movement of the adjusting wheel 26 is transmitted through the ball bearing 32 to the outer rack 22 and so causes by means of the pinions 21, 15 and 16 displacement of the two rods 4 and 5 and the weight segments 2 and 3 attached thereto.

The displacement of the weight segments 9, 10 in the other coordinate direction is accomplished in analogous manner. The adjusting wheel 27 is provided with an outer thread 36 engaging a corresponding inner thread of hood 28. Rotation of the adjusting wheel 27 in the one or the other sense therefore moves this wheel in an axial direction. This axial movement is transmitted through a pair of ball bearings 37 to the inner rack 25 and furthermore to the weight segments 9 and 10.

The described embodiments of a balancing head avoid complicated kinematic members. Especially, no gear wheels are required to mate with each other corresponding to the number of rotations. This guarantees a long life as well as little maintenance service.

Another modified embodiment as depicted in FIG. 10 is characterized by further simplifications as well as by an advantageous additional feature. For the sake of easier understanding, in FIG. 10 the previously described parts of the balancing head are not designated with reference numerals. FIG. 10 again shows a two-piece balancing head case 40. The non-rotating stationary part 41 adjacent to the left side of case 40 corresponds to the respective parts of FIG. 6 to 9, except structural differences below explained.

A difference from the embodiment of FIG. 6 to 9 is estabilshed in that the pinions 15, 16, 21 and 17, 18 and 23 are here missing. In lieu thereof the teeth of the axially movable racks and of the radially movable racks mate directly with each other. To make this possible, the teeth of these racks are arranged at an oblique angle. In FIG. 10 the teeth of the axial rack 43 can be seen extending at an oblique angle, this rack 43 being analogous to rack 25 of FIG. 6. A corresponding oblique toothing of the pair of radially movable racks 44, 44a mates with the teeth of rack 43, only rack 44 being shown however in FIG. 10. Weight members 45 are again connected with the racks 44, 44a which are shown in the drawing in one of their end positions.

For the sake of clarity, in illustrating the mass compensating means for the second coordinate direction only the pair of racks 47 is shown in FIG. 10 whereas the corresponding weight segments are omitted. The oblique teeth of racks 47 engages oblique teeth of the outer hollow rack 48, in exactly the same manner as the teeth of racks 43 and 44 engage each other.

Due to an axial movement of the racks 43 or 48, the oblique engaging teeth slide with respect to each other and cause, due to the corresponding force components, a displacement of the radial racks 44 and 47, respectively.

The embodiment of FIG. 10 makes it possible to select optionally within certain limits by an appropriate selection of the angle of inclination of the oblique teeth the gear ratio between the axial movement and the radial displacement caused thereby.

In the embodiment of FIG. 10 the hood 28 is prolonged in the direction to the left and is provided with openings different from the openings of hood 28 in FIGS. 7–9. These openings can be closed by resilient shutter tapes 51, 52 slidable in guiding ways 53. Knurled knobs 54, 55 are provider to operate these tapes 51, 52. At the other side of the hood a small plate 57 is provided at the level of the two guiding ways 53, which is secured by means of screws 56. The small plates 57 serve to fasten a lock 58 provided to block the adjusting wheels 26 and 27 (which are here both of same size) as soon as the shutter tapes 51, 52 are moved by a small amount from the opened position. The wheels 26 and 27 therefore are provided at the outer surfaces with a series of fine notches 59 extending parallel to the axis of the wheels.

By virtue of this measure, this device is protected against possible harm from the unavoidable grinding dust, dirt, moisture or the like. Furthermore, by means of the automatically registering locking device an undesired displacement of the adjusting wheels is prevented. It is clear that the means by which the balancing head of FIG. 10 is equipped, i.e. the shutter tapes and the locking means can be applied easily also to the embodiments of FIGS. 6 through 9 in an advantageous manner.

The device of this invention permits the compensation of unbalances of a part during its rotation. It can be used for balancing in one plane as well as in two planes. It is adapted for manual control as well as for automatic control. The employment of the device of this invention is especially advantageous in cases when revolving parts are subject to a continuous variation of their balance conditions so that a continuous compensation is required. The device of this invention permits the compensation of even the greatest unbalances as they practically occur since the weight members used and their effective radii can be adapted without difficulties to practical requirements. Finally it has to be pointed out as an essential advantage of this device that it can be attached without major changes to machines already in use. The quality of compensation that can be achieved is extremely high due to the proposed sensitive adjustment mechanism and is practically independent of wear.

While the embodiments of the present invention as herein disclosed constitute preferred forms, it is to be understood that other forms might be adopted, all within the scope of claims which follow:

What is claimed is:

1. A device to compensate unbalances of axially symmetrical parts revolving about an axis, particularly grinding discs and the like, comprising a case adapted to be fixedly secured to said part and to rotate therewith, weight means in said case, unbalance measuring means, and means responsive to said measuring means to vary the position of said weight means as a function of unbalance relative to said case along at least two different substantially radial directions in order to generate centrifugal forces to compensate the unbalances of said revolving part, said position varying means comprising connecting rods and eccentric discs supported within said case, each of said connecting rods being interconnected between one of said weight means and one of said discs, and means to change the angular position of said discs with respect to said case.

2. A device according to claim 1, wherein two unbalance compensating means are arranged extending essentially perpendicularly with respect to said revolving axis, movable weight means and means to vary the position of said weight means being associated with each of said unbalanced compensating means to compensate dynamically the unbalances of said axially symmetrical part.

3. A device according to claim 1, wherein said position varying means comprises push rods and eccentric discs supported within said case, each of said push rods being interposed between one of said weight means and one of said discs, means to change the angular position of said discs with respect to said case, and resilient means adapted to act on said weight means in order to compensate centrifugal forces acting on said weight means during rotation thereof.

4. A device to compensate the unbalances of axially symmetrical parts revolving about an axis, comprising a case adapted to be fixedly mounted to said part and to rotate therewith, at least one first and one second weight member mounted in said case reciprocally with respect to a first and a second axis being at an angle to each other greater than zero degrees, at least one first and one second rack extending within said case in a plane substantially perpendicular to said revolving axis, and connected to said first and to said weight member, respectively, a third and a fourth rack extending substantially axially and protruding beyond said case, said third and said fourth rack associated with said first and said second rack, in such a manner that an axial movement of said third and fourth rack causes a corresponding radial movement of said first or second rack, respectively.

5. A device according to claim 4, comprising furthermore a first and a second wheel to adjust said third and said fourth rod, respectively, said wheels being stationary with respect to said revolving part.

6. A device according to claim 5 comprising furthermore a hood member being stationary with respect to said revolving part, and a ball bearing supporting said hood rotatably with respect to said case, said hood enclosing said wheels and having openings allowing access to said wheels.

7. A device according to claim 6, wherein one of said third and said fourth racks is of tubular shape and receives the other rack concentrically, a second ball bearing being interconnected between said first adjusting wheel and said third rack, and a third ball bearing being interconnected between said second adjusting wheel and said fourth rack, said hood having a first and a second thread, and said adjusting wheels being provided with a third and a fourth thread, respectively, said third and said fourth thread engaging said first and said second thread, respectively, so that rotation of said wheels generates corresponding movement of said racks in order to vary the position of said weight members with respect to said case.

8. A device according to claim 7, wherein said adjusting wheels are provided at their periphery with notches, latch means being arranged adjacent to said notches and being adapted to engage said notches in order to lock said wheels in an angular position.

9. A device according to claim 4, wherein said third and said fourth racks are guided concentrically with respect to each other.

10. A device according to claim 9, wherein one of said concentrically guided racks is a tube and wherein the other of said racks is a rod of round cross-section and is received by said tube, each of said racks having a flattened portion at their outer surface, said flattened portion extending in the direction of the axis of said rails and being provided with teeth.

11. A device according to claim 4, wherein said first, second, third and fourth racks each are provided with teeth extending at oblique angles with respect to the main axes of said racks, teeth of said first rack mating corresponding teeth of said third rack and teeth of said second rack engaging corresponding teeth of said fourth rack, a first and a second wheel being provided to adjust said third and said fourth rack, respectively, said wheels being stationary with respect to said revolving part, and adapted to move said third and said fourth racks, respectively, axially so that said first and said second racks are moved and consequently the position of said weight members connected thereto is varied.

12. A device according to claim 4, comprising furthermore at least one first and at least one second pinion means, said first pinion means mating with said first and said third rack and said second pinion means mating with said second and said fourth rack so that movement of said third rack causes by means of said first pinion means movement of said first rack and that movement of said fourth rack by means of said second pinion means causes movement of said second rack.

13. A device according to claim 12, comprising furthermore a first and a second wheel to adjust said third and said fourth rack, respectively, in axial direction, said wheels being stationary with respect to said revolving part.

References Cited

UNITED STATES PATENTS

| | | | |
|---|---|---|---|
| 2,882,746 | 4/1959 | Largen | 74—573 |
| 2,836,120 | 5/1958 | Navarro | 74—574 |
| 3,177,738 | 4/1965 | Achilles | 74—573 |
| 3,248,967 | 5/1966 | Lewis | 74—573 |

FRED C. MATTERN, JR., *Primary Examiner.*

W. S. RATLIFF, *Assistant Examiner.*